United States Patent [19]

Okada

[11] Patent Number: 6,133,953

[45] Date of Patent: Oct. 17, 2000

[54] COLOR CAMERA HAVING A SINGLE IMAGING ELEMENT AND CAPABLE OF RESTRICTING UNWANTED FALSE COLOR SIGNAL

[75] Inventor: Hidefumi Okada, Daito, Japan

[73] Assignee: Sanyo Electric Co., Ltd., Japan

[21] Appl. No.: 09/021,481

[22] Filed: Feb. 10, 1998

[30] Foreign Application Priority Data

Feb. 20, 1997 [JP] Japan ................................. 9-036203

[51] Int. Cl.[7] ................................................ H04N 3/14
[52] U.S. Cl. .................................... 348/272; 348/279
[58] Field of Search ................................. 348/272, 277, 348/279, 599, 625, 606, 630, 659, 660, 712, 713; 358/518; 382/162, 167

[56] References Cited

U.S. PATENT DOCUMENTS

| | | | |
|---|---|---|---|
| 4,591,900 | 5/1986 | Heeb et al. ............................ | 348/277 |
| 4,716,455 | 12/1987 | Ozawa et al. . | |
| 5,202,756 | 4/1993 | Sasaki et al. .......................... | 348/659 |
| 5,280,351 | 1/1994 | Wilkinson . | |
| 5,285,267 | 2/1994 | Lim ......................................... | 348/713 |
| 5,291,276 | 3/1994 | Matsumoto et al. ................... | 348/659 |
| 5,508,742 | 4/1996 | Geerlings et al. ..................... | 348/279 |
| 5,552,827 | 9/1996 | Maenaka et al. . | |
| 5,568,193 | 10/1996 | Kawahara ............................... | 348/279 |
| 5,581,298 | 12/1996 | Sasaki et al. . | |
| 5,726,707 | 3/1998 | Sakurai et al. ......................... | 348/279 |

FOREIGN PATENT DOCUMENTS

| | | | |
|---|---|---|---|
| 0483837 | 5/1992 | European Pat. Off. ....... | H04N 5/262 |
| 0630159 | 12/1994 | European Pat. Off. ......... | H04N 9/04 |
| 63-97078 | 4/1988 | Japan . | |

*Primary Examiner*—Wendy Garber
*Assistant Examiner*—Alicia M. Harrington
*Attorney, Agent, or Firm*—Michaelson & Wallace; Peter L. Michaelson

[57] ABSTRACT

A CCD portion is driven by a driving circuit for separately reading out all pixels. Data for 4 lines are input in parallel to a two-dimensional register array by scanning line delay devices, and an interpolation processing is performed for each of color signals G, Mg, Cy and Ye based on data corresponding to pixels in a 4 row by 4 column matrix. Color difference signal generation circuit performs a color separation processing based on thus interpolated color signals.

11 Claims, 10 Drawing Sheets

| Ye00 | Cy01 | Ye02 | Cy03 |
|---|---|---|---|
| G10 | Mg11 | G12 | Mg13 |
| Ye20 | Cy21 | Ye22 | Cy23 |
| G30 | Mg31 | G32 | Mg33 |

INTERPOLATION FILTER FOR G

INTERPOLATION FILTER FOR Mg

INTERPOLATION FILTER FOR Cy

FIG. 2A
| Ye00 | Cy01 | Ye02 | Cy03 |
|------|------|------|------|
| G10  | Mg11 | G12  | Mg13 |
| Ye20 | Cy21 | Ye22 | Cy23 |
| G30  | Mg31 | G32  | Mg33 |
FIG. 2C
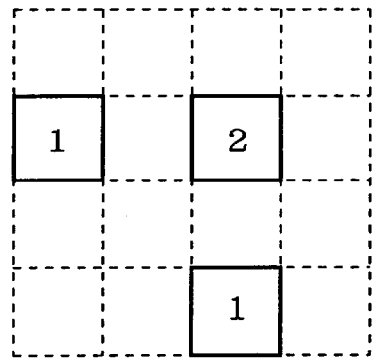
INTERPOLATION FILTER FOR G
FIG. 2B
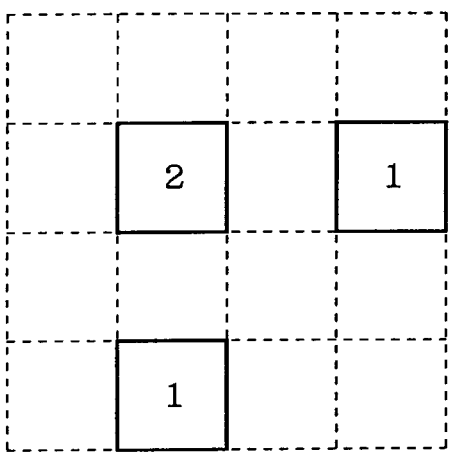
INTERPOLATION FILTER FOR Mg
FIG. 2D
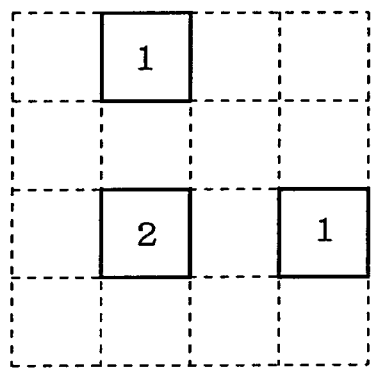
INTERPOLATION FILTER FOR Cy
FIG. 2E
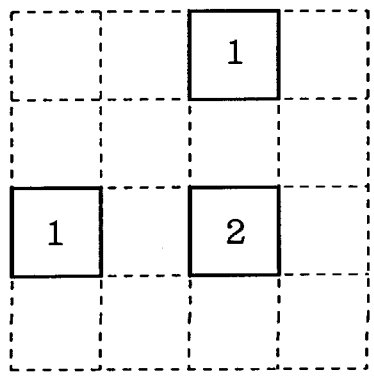
INTERPOLATION FILTER FOR Ye

| Ye00 | Cy01 | Ye02 | Cy03 |
|------|------|------|------|
| G10  | Mg11 | G12  | Mg13 |
| Ye20 | Cy21 | Ye22 | Cy23 |
| G30  | Mg31 | G32  | Mg33 |

COLOR CAMERA HAVING A SINGLE IMAGING ELEMENT AND CAPABLE OF RESTRICTING UNWANTED FALSE COLOR SIGNAL

BACKGROUND OF THE INVENTION

1. Field of the Invention

The present invention relates generally to color cameras, and more particularly, to a 1-chip color camera having a color separation circuit for processing signals from a solid-state imaging device where the device includes photoelectric conversion elements arranged in an array corresponding to color filters themselves being arranged in an array according to the color difference sequential system.

2. Description of the Background Art

A CCD (Charge Coupled Device) widely today as an imaging device in a color camera simply changes the amplitude of a signal to output depending upon the brightness of received light and does not include any color information in its output signal. Some device is necessary such as using optical means to filter light coming into the CCD in order to obtain color information.

In a color camera for home use, a so-called 1-chip image pickup system to extract three primary color signals from a single CCD is employed and a so-called simultaneous color imaging system using a color filter array on the light receiving side of the CCD is also employed.

STRUCTURE OF INTERLINE TRANSFER CCD

FIG. 10 is a block diagram schematically showing the configuration of an interline transfer CCD portion 10 as an example of CCD generally used in a home use color camera.

Interline transfer CCD portion 10 includes a photosensitive portion 12 of pn junction type photodiodes arranged in an array, a transfer portion 14 including analog shift registers formed of CCDS, and a horizontal transfer register 16 which receives charges transferred by transfer portion 14 and transfers signals produced by converting a sequentially transferred signal charges into voltages for output.

In FIG. 10, pn junction type photodiodes for three pixels are provided in each of the vertical and horizontal directions for ease of illustration. In practice, in a CCD for use in a color camera, photodiodes corresponding to 500 pixels in the vertical direction and to 500 to 800 pixels in the horizontal direction are arranged in an array.

The operation of the CCD portion will be now briefly described.

When light comes into the photodiodes, charges are generated and accumulated within the diodes. Then, the accumulated charges are transferred to analog shift register 14 at a time by applying a prescribed voltage to the shift gate. CCD analog shift register 14 transfers the charges toward sequential horizontal transfer register 16 in response to application of clock pulse voltages $\phi_{v1}$, $\phi_{v2}$ and $\phi_{v3}$. Horizontal transfer register 16 converts thus transferred signal charges into voltages and then is driven by externally applied horizontal driving signals $\phi_{H1}$, $\phi_{H2}$ and $\phi_{H3}$ to externally output the voltages as sequential imaging signal outputs.

DRIVING METHOD OF INTERLINE TRANSFER CCD

There are generally two modes for driving the interline transfer CCD portion, in other words modes according to the frame integration method and the field integration method. In a color camera, the frame integration method, in which all pixels are basically read out, is sometimes used for a color filter array in the color difference sequential system.

Hereinafter, the operation of the interline transfer CCD portion in a frame integration mode which permits reading on a one-pixel-basis will be considered.

METHOD OF SEPARATING COLOR DIFFERENCE SIGNALS

FIG. 11 is a diagram schematically showing an array of color filters arranged according to the color difference sequential system.

As shown in FIG. 11, the color filters according to the color difference sequential system, color filters for magenta (hereinafter simply as Mg), green (G), cyan (Cy), and yellow (Ye) are arranged in a mosaic form.

Herein, in mixing optical colors, a so-called additive mixing is possible, and therefore the following relation is established between three primary colors, red (R), green (G), and blue (B) and their complementary colors, Mg, Ye, and Cy:

$$Mg=R+B \quad (1)$$

$$Ye=R+G \quad (2)$$

$$Cy=B+G \quad (3)$$

Using the above Mg, G, Ye and Cy as the colors of color filters, the intensity of the G signal having the largest weight relative to the luminance signal among the three primary colors R, G and B may be set larger than that of the R signal or B signal.

In the example shown in FIG. 11, among a color filter array according to the color difference sequential system, an array portion of a 4 row by 4 column matrix is extracted from the color filter array according to the color difference sequential system. In the odd rows (x=1, 3), G color filters and Mg color filters are alternately arranged in the horizontal direction (y-direction).

Meanwhile, in the even rows (x=0, 2), Ye color filters and Cy color filters are alternately arranged in the horizontal direction.

FIG. 12 shows an arrangement of color filters in a 4 row by 4 column matrix, shifted by 1 pixel in the horizontal direction from the arrangement shown in FIG. 11.

If outputs from photoelectric conversion elements are sequentially read out in the y-direction, for example, outputs from photoelectric conversion elements for a 4 row by 4 column matrix read out from the CCD portion repeatedly alternately correspond to outputs from the color filter array shown in FIG. 11 and to outputs from the color filter array shown in FIG. 12. In the arrangement of the color filters according to the color difference sequential system as shown in FIG. 11, the arrangement of color filters in an arbitrary 4 row by 4 column matrix is any of four arrangements including those shown in FIGS. 11 and 12 and arrangements 1 pixel shifted in the x-direction from the arrangements shown in FIGS. 11 and 12.

FIG. 13 is a diagram showing the concept of a conventional color separation method. In FIG. 13, a 2 row by 2 column matrix is extracted from the arrangement of the 4 row by 4 column matrix shown in FIG. 11. In the conventional color separation method, a luminance signal Y, a first color difference signal Cb and a second color difference signal Cr are generated for the central position of pixels in the 2 row by 2 column matrix from signals corresponding to the pixels in the 2 row by 2 column matrix among signals obtained by reading out all the pixels in the CCD portion.

Herein, luminance signal Y, first color difference signal Cb, and second color difference signal Cr may be represented by the following expressions, wherein R, G and B represent signal intensities corresponding to the three primary colors:

$$Y = (Cy + Mg) + (Ye + G) \quad (4)$$
$$= (R + G + 2B) + (R + 2G)$$
$$= 2R + 3G + 2B$$

$$Cb = (Cy + Mg) - (Ye + G) \quad (5)$$
$$= (R + G + 2B) - (R + 2G)$$
$$= 2B - G$$

$$Cr = (Ye + Mg) - (G + Cy) \quad (6)$$
$$= (2R + G + B) - (B + 2G)$$
$$= 2R - G$$

Therefore, only if signals from the photoelectric conversion elements in the 2 row by 2 column matrix shown in FIG. 13 are available, luminance signal Y, first color difference signal Cb, and second color difference signal Cr may be basically obtained, based on which three primary color signals may be separated according to the following operations:

$$G = (2Y - 2Cr - 2Cb)/10 \quad (7)$$
$$R = (Y + 4Cr - Cb)/10 \quad (8)$$
$$B = (Y - Cr + 4Cb)/10 \quad (9)$$

The above-described color separation method is however encountered with the following problems.

FIG. 14 is a graph showing the frequency characteristics of output signals Ye+G, Cy+Mg, G+Cy and Ye+Mg in the horizontal direction when the conventional color separation method as shown in FIG. 13 is implemented using digital filters.

In FIG. 13, assuming that signals from the CCD portion are read out sequentially in the y-direction, signals Ye+G and Cy+Mg are generated from signals sampled at the same time point, while, for signals G+Cy and Ye+Mg, signals from the CCD portion should be held for 1 sampling time period.

Therefore, the gains of signals Ye+G and Cy+Mg do not have frequency dependence, while signals G+Cy and Ye+Mg have their gains monotonically decreased toward the Nyquist frequency.

If the frequency characteristics of signals in the horizontal direction, based on which the first and second color difference signals Cb and Cr are generated, are different, an unwanted false color signal is generated, which leads to a deterioration in the picture quality.

SUMMARY OF THE INVENTION

It is an object of the invention to provide a 1-chip color camera capable of controlling color component signals to have similar band characteristics and restricting unwanted false color signals, thereby improving the picture quality.

Another object of the invention is to provide a 1-chip color camera capable of restricting a deterioration in the resolution if color signal components are controlled to be in the same band.

Briefly stated, a 1-chip digital color camera according to the present invention includes a solid-state imaging element and a color separation circuit.

The solid-state imaging element includes photoelectric conversion elements corresponding to pixels arranged in an array. The solid-state imaging element includes, on the light receiving side, a color filter array in which green filters and first to third complementary color filters are arranged in a mosaic corresponding to the photoelectric conversion elements according to the color difference sequential system.

The color separation circuit receives the output of the solid-state imaging element and produces color data corresponding to the central position of pixels in an arbitrary k row by k column matrix (k:even number). The color separation circuit includes color interpolation circuits for green and the first to third complimentary colors for producing the weighted average of outputs from photoelectric conversion elements, at which corresponding color filters are provided, among the plurality of photoelectric conversion elements corresponding to the pixels in the k row by k column matrix based on the arrangement of the color filters and a first operation circuit for separating color data corresponding to the central position from outputs received from the color interpolation circuits.

Therefore it is a main advantage of the present invention that an interpolation processing is performed before a color separation processing, and color components are controlled to be in the same band, so the bands of signals Ye+G and Cy+Mg and signals G+Cy and Ye+Mg are very close to each other up to the vicinity of ½ the Nyquist frequency, and therefore unwanted false color signals in the vicinity of ½ the Nyquist frequency may be readily reduced.

Another advantage of the invention is that in generating an aperture signal, a deterioration in the resolution caused by interpolation processing can be restricted.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 2A to 2E are schematic diagrams for use in illustration of an interpolation processing according to the invention, wherein FIG. 2A shows a color filter array arrangement according to the color difference sequential system, and FIGS. 2B to 2E show arrangements of weighting coefficients used at the time of interpolating processings to color signal components;

DESCRIPTION OF THE PREFERRED EMBODIMENTS

Figure 1:
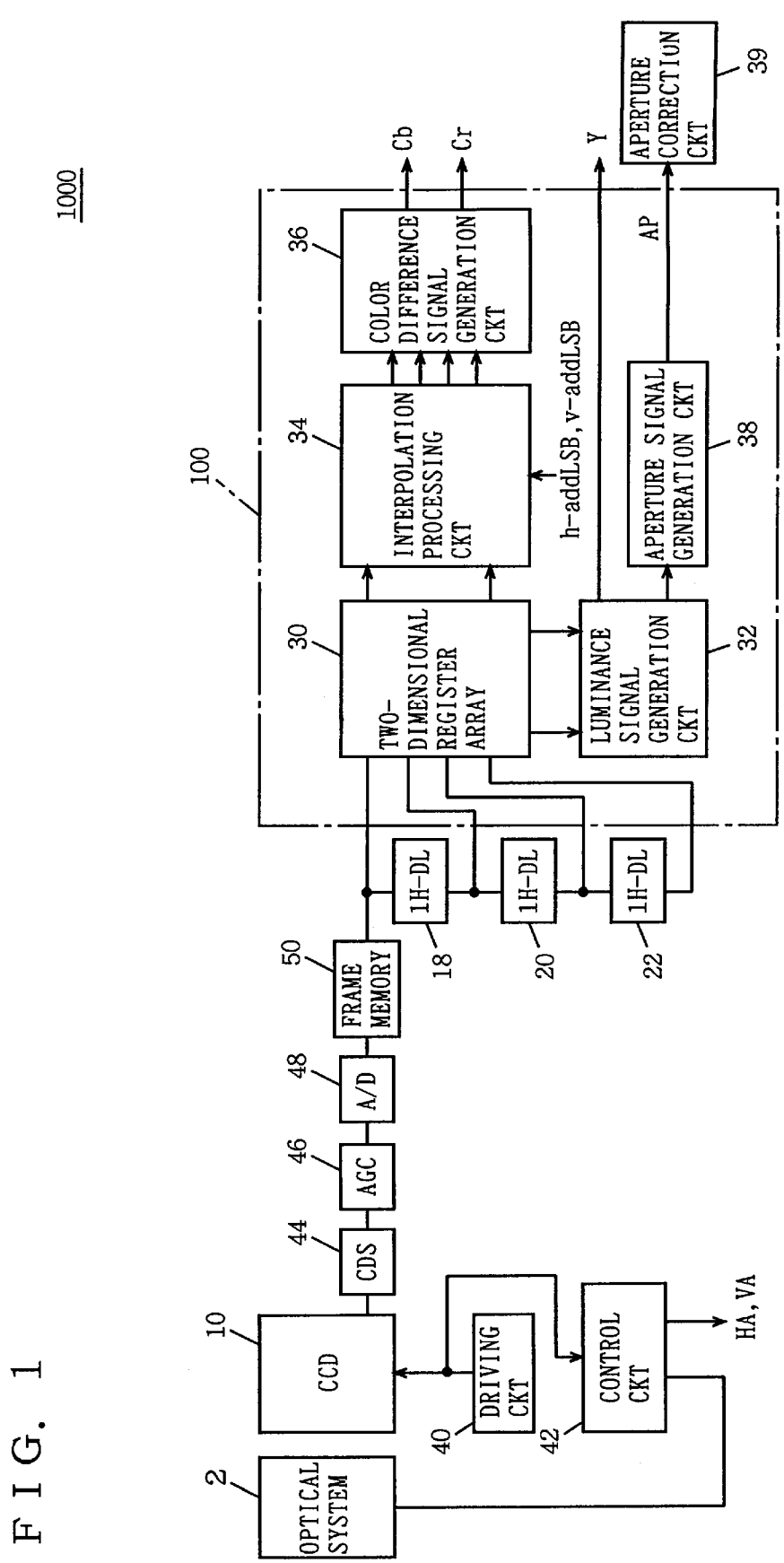
FIG. 1 is a schematic block diagram of the configuration of a color signal processing system 1000 according to the invention.

FIG. 1 is a schematic block diagram showing the configuration of a color signal processing system 1000 including stages from an optical system 2, forming an optical image of an object to image at an imaging element, CCD portion 10 to a color separation circuit 100 in the configuration of a 1-chip color camera according to an embodiment of the invention.

Color signal processing system 1000 includes an optical system 2 which receives light from an object, a CCD portion 10 which converts an optical image formed by optical system 2 into an electrical signal, a driving circuit 40 which drives CCD portion 10 to separately read out all pixels, a correlated double sampling circuit (hereinafter referred to as CDS circuit) 44 for removing noise from an imaging signal received from CCD portion 10 according to a well known method, an auto gain control signal circuit (hereinafter AGC circuit) 46 for amplifying the output of CDS circuit 44, an A/D conversion circuit 48 for converting the output of AGC circuit 46 into a digital signal, a frame memory 50 for holding output signals for even lines and output signals for odd lines, in CCD portion 10, received from A/D conversion circuit 48 for 1 image frame in a nested manner, and a control circuit 42 which outputs a horizontal address HA and a vertical address VA for a pixel from which a signal is read out in response to a CCD driving signal from driving circuit 40.

Color signal processing system 1000 further includes a scanning line delay device 18 which outputs a second input signal produced by delaying a first input signal from frame memory 50 by 1 scanning line time period and a third input signal produced by delaying the second input signal by 1 scanning line time period, a scanning line delay device 22 which outputs a fourth input signal produced by delaying the third input signal by 1 scanning line time period, and a color separation circuit 100 serving as a two-dimensional non-recursive digital filter which receives first to fourth input signals and outputs luminance signal Y, first color difference signal Cb and second color difference signal Cr.

Color separation circuit 100 includes a two-dimensional register array 30 which sequentially receives the first to fourth input signals in parallel and holds data from pixels in a 4 row by 4 column matrix (including green, yellow, cyan and magenta color signals corresponding to an arrangement of color filters in the CCD portion from which the signals have been read out at that point), an interpolation processing circuit 34 which receives signals from two-dimensional register array 30 and produces the weighted average of color signals of each of green, yellow, cyan and magenta to produce a color signal corresponding to the central position of the pixels in the 4 row by 4 column matrix by interpolation, a color difference signal generation circuit 36 for generating color difference signals Cb and Cr from the color signals generated by the interpolation, a luminance signal generation circuit 32 which receives a signal from two-dimensional register array 30 and generates a luminance signal Y, and an aperture signal generation circuit 38 which receives luminance signal Y and (though, for simplicity, not specifically shown in this figure) a signal from two-dimensional register array 30 and outputs an aperture signal AP.

Herein, imaging lenses included in optical system 2 are generally provided with variable mechanisms for a diaphragm function, focusing, zooming and the like.

Color signal processing system 1000 further includes an aperture correction circuit 39 for correcting an aperture (emphasizing a contour) in response to an aperture signal.

In the above-described structure, the first to fourth, four kinds of input signals correspond to imaging signals for four scanning line (four lines) and are input to color separation circuit 100 on a 4-line-basis.

Thus, color separation circuit 100 and the three scanning line delay devices 18 to 22 implement an FIR (Finite Impulse Response) filter.

Interpolation and Color Separation

FIGS. 2A to 2E are schematic diagrams for use in illustration of an interpolation processing according to the embodiment of the invention, wherein FIG. 2A shows an example of an arrangement of a color filter array in a 4 row by 4 column matrix, FIG. 2B shows a distribution of weighting coefficients at the time of interpolation processing for the arrangement of magenta color filters in FIG. 2A, FIG. 2C shows a distribution of weighting coefficients at the time of interpolation processing for the arrangement of green filters in FIG. 2A, FIG. 2D shows a distribution of weighting coefficients at the time of interpolation processing for the arrangement of cyan color filters in FIG. 2A, and FIG. 2E shows a distribution of weighting coefficients at the time of interpolation processing for the arrangement of yellow filters in FIG. 2A.

More specifically, in this embodiment, by an interpolation processing according to the following weighted average processing for the weights shown in FIGS. 2B–2E applied to the pixels shown in FIG. 2A, a magenta signal component, a green signal component, a cyan signal component and a yellow signal component corresponding to the central position in the pixels in the 4 row by 4 column matrix are generated.

$Mg = 2 \times Mg11 + Mg13 + Mg31$ (10)

$G = 2 \times G12 + G10 + G32$ (11)

$Cy = 2 \times Cy21 + Cy01 + Cy23$ (12)

$Ye = 2 \times Ye22 + Ye02 + Ye20$ (13)

Figures 11, 12:
FIG. 11 is a schematic diagram showing an example of an arrangement of color filters in a 4 row by 4 column matrix in a conventional arrangement of color filters according to the color difference sequential system.
FIG. 12 is a schematic diagram showing another example of a conventional arrangement of color filters in a 4 row by 4 column matrix in the arrangement of color filters according to the color difference sequential system.

Note that, as described in conjunction with FIGS. 11 and 12, there are four kinds of arrangements of color filters corresponding to pixels in a 4 row by 4 column matrix, and other than the case of the arrangement shown in FIG. 2A, the distributions of weighting coefficients for weighted average processing to color filters correspond to the other distributions in FIGS. 2B to 2E, respectively.

As described above, according to this embodiment, CCD portion 10 performs an all pixel-separately read out operation. More specifically, corresponding to an arrangement in which color filters Ye and Cy are alternately arranged in the horizontal direction (y-direction) in the 0-th line in the vertical direction (x-direction) as shown in FIG. 2A, Ye and Cy are alternately output as read out signals from CCD portion 10 for a scanning line corresponding to the line. In the next 1st line (corresponding to x=1), signals G and Mg are alternately output.

Figure 3:
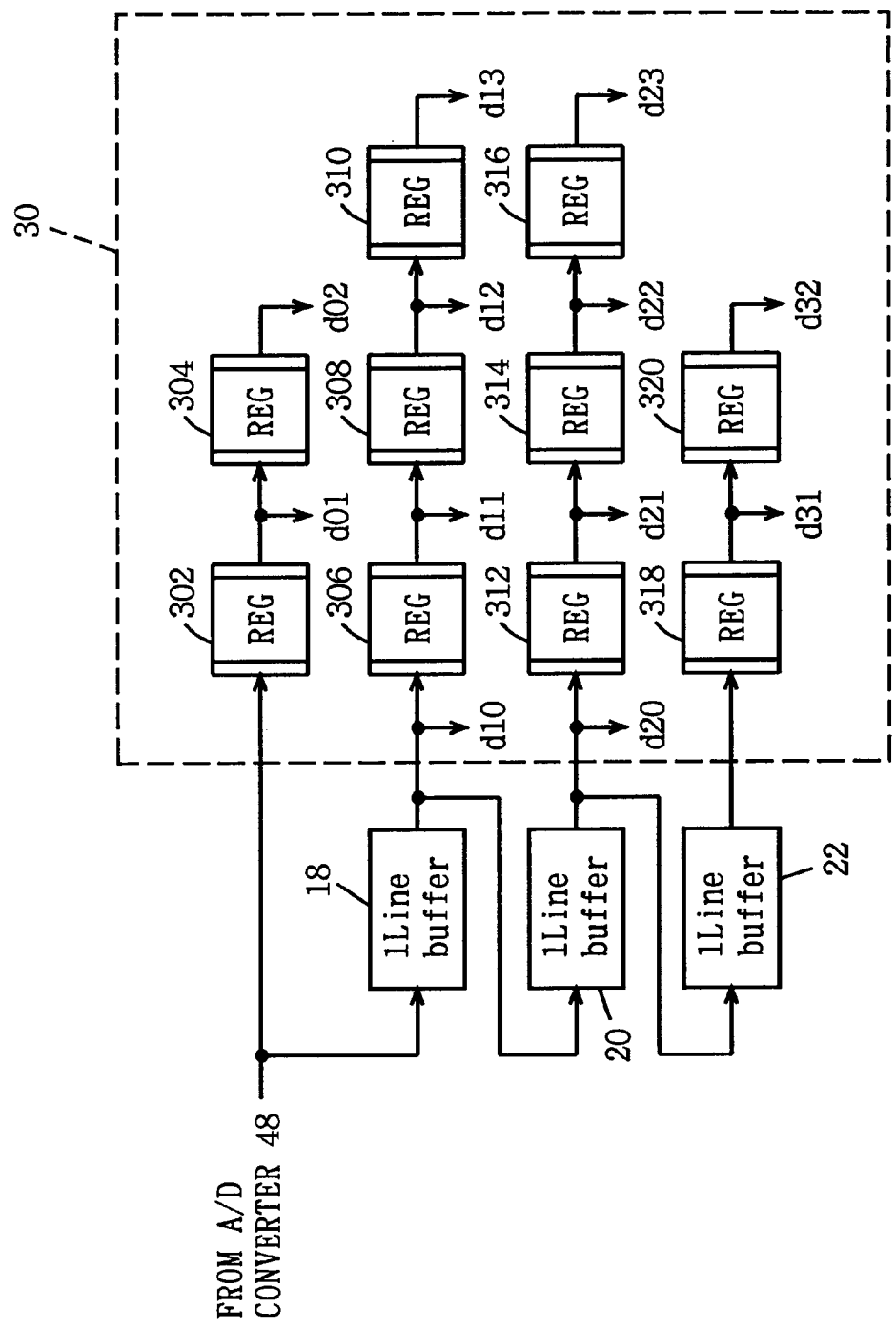
FIG. 3 is a block diagram showing the configuration of two-dimensional register array 30 in color signal processing system 1000 shown in FIG. 1.

FIG. 3 is a block diagram showing in further detail the configurations of scanning line delay devices 18, 20 and 22 and two-dimensional register array 30 which receive a read out signal from such CCD portion 10 in the configuration shown in FIG. 1.

Two-dimensional register array 30 includes a register 302 which receives an output from frame memory 50 holding an output signal from A/D converter 16 and outputs a 1 clock delayed signal d01, and a register 304 which outputs a signal d02 1 clock delayed from received signal d01.

Two-dimensional register array 30 further includes a register 306 which outputs a signal d11 1 clock delayed from signal d10 received from scanning line delay device 18, a register 308 which outputs a signal d12 1 clock delayed from received signal d11, a register 310 which outputs a signal d13 1 clock delayed from received signal d12, a register 312 which outputs a signal d21 1 clock delayed from a signal d20 received from scanning line delay device 20, a register 314 which outputs a signal d22 1 clock delayed from received signal d21, a register 316 which outputs a signal d23 1 clock delayed from received signal d22, a register 318 which outputs a signal d31 1 clock delayed from a signal received from scanning line delay device 22, and a register 320 which outputs a signal d32 1 clock delayed from received signal d31.

More specifically, two-dimensional register array 30 converts signals serially read out from CCD portion 10 such that signals from photoelectric conversion elements corresponding to pixels in a 4 row by 4 column matrix are output in parallel.

More specifically, signals d01 to d32 described above correspond to expressing output signals from photoelectric conversion elements corresponding to pixels (x, y) in CCD portion 10 using symbols d, x and y.

Figure 4:
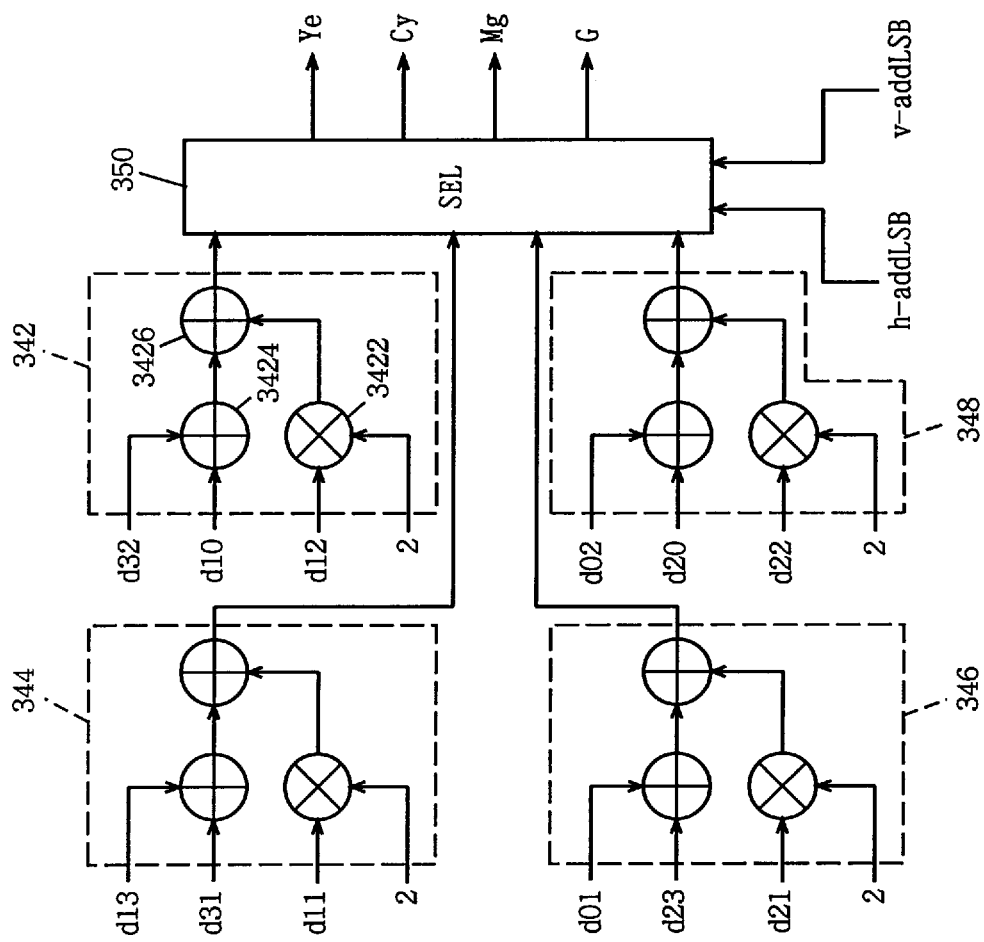
FIG. 4 is a block diagram showing the configuration of interpolation processing circuit 34 in color signal processing system 1000 shown in FIG. 1.

FIG. 4 is a block diagram showing in further detail the configuration of interpolation processing circuit 34 in FIG. 1.

Interpolation processing circuit 34 includes an interpolation operation portion 342 which receives signals d12, d10 and d32 and outputs a first interpolation signal, an interpolation operation portion 344 which receives signals d11, d13 and d31 and outputs a second interpolation signal, an interpolation operation portion 346 which receives signals d21, d01 and d23 and outputs a third interpolation signal, an interpolation operation portion 348 which receives signals d22, d02 and d20 and outputs a fourth interpolation signal, and a selecting circuit 350 controlled by a control circuit 42 to output the first to fourth interpolation signals as green signal G, cyan signal Cy, magenta signal Mg and yellow signal Ye, respectively.

Herein, interpolation operation portion 342 includes a multiplier 3422 which doubles the amplitude of received signal d21 for output, an adder 3424 for outputting the result of adding signal d10 and signal d32, and an adder 3426 for outputting the result of adding the amplitudes of outputs from adder 3424 and multiplier 3422 as the first interpolation signal. Interpolation operation portions 344, 346 and 348 have basically the same configuration as interpolation operation portion 342, however they receive different signals.

Therefore, when color filters are arranged as shown in FIG. 2A, interpolation operation portions 342, 344, 346 and 348 correspond to weighted average processings based on the arrangements of weighting coefficients shown in FIGS. 2C, 2B, 2D and 2E, respectively.

Selecting circuit 350 responds to the least significant bit h-addLSB of horizontal address HA and the least significant bit v-addLSB of vertical address VA representing the present reading position in CCD portion 10 output from control circuit 42 to switch the correspondence between the first to fourth interpolation signals and green signal G, cyan signal Cy, magenta signal Mg and yellow signal Ye for output.

If color filters are arranged as shown in FIG. 2A, for example, selecting circuit 350 outputs signals such that the first interpolation signal corresponds to green signal G, the second interpolation to magenta signal Mg, the third interpolation signal to cyan signal Cy and the fourth interpolation signal to yellow signal Ye.

If the arrangement of color filters corresponding to pixels in a 4 row by 4 column matrix from which signals are read out changes, selecting circuit 350 changes the above-described corresponding relation accordingly.

By the above-described operation of interpolation processing circuit 34, for each of green signal G, cyan signal Cy, magenta signal Mg and yellow signal Ye, a signal corresponding to the central position of pixels in 4 row×4 column matrix is generated by prescribed weighted average processings to signals read out from photoelectric conversion elements corresponding to the pixels in the 4 row by 4 column matrix.

Figure 5:
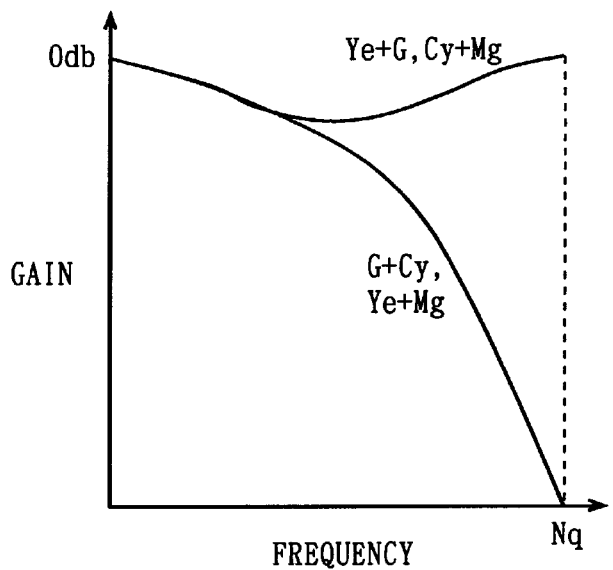
FIG. 5 is a graph showing the frequency characteristics of color signals according to the invention.
Figure 14:
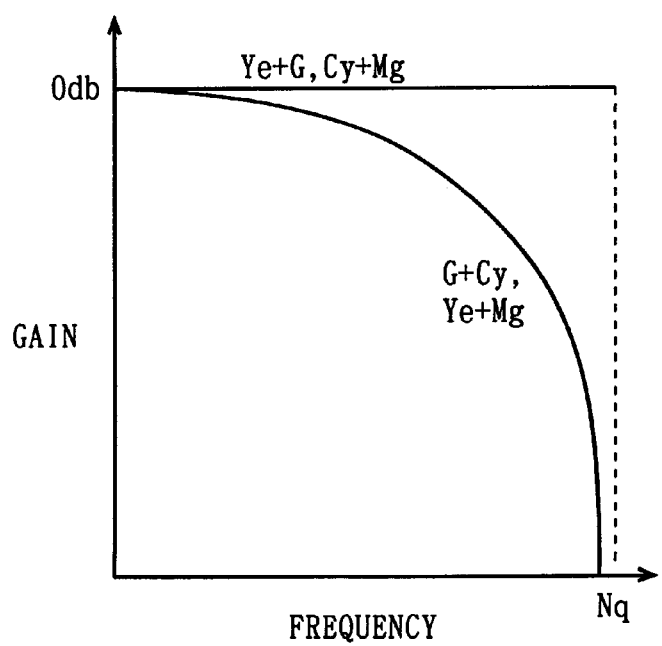
FIG. 14 is a diagram showing the frequency characteristics of output signals according to the conventional separation method.

FIG. 5 is a graph showing the frequency characteristics of output signals Ye+G, Cy+Mg, G+Cy and Ye+Xg when interpolation processings are implemented using a digital filter as shown in FIG. 3, in contrast to FIG. 14.

The frequency characteristics of output signals Ye+G, Cy+Mg, G+Cy and Ye+Mg are virtually the same up to the vicinity of the ½ Nyquist frequency as a result of interpolation processing. Therefore, if color difference signals Cb and Cr are obtained by a color separation processing based on these signals, unwanted false color signals can be restricted, which leads to improvement in the picture quality.

Note that in the foregoing, the interpolation processings by the weighted average processing of the arrangements of weighting coefficients shown in FIGS. 2B to 2E are performed to output signals from photoelectric conversion elements corresponding to pixels in a 4 row×4 column matrix, but the invention is not limited to such a case. For example, pixels to be subjected to such an interpolation processing may be pixels in a k row by k column matrix if k is an even number.

Four sets of weighting coefficients of the weighted average, each corresponding to one of four color signals, in other words, green signal, cyan signal, magenta signal and yellow signal, need only be arranged in such a way that the arrangement of one of the four sets corresponds to one of the arrangements of the rest at every 90° rotation around the central position.

Furthermore, the color signals are not necessarily limited to the green signal, cyan signal, magenta signal and yellow signal, and the invention is applicable to combinations of other color signals such as a combination of YM, CG, YG and CM used for color filters according to the frame color difference sequential system.

Figure 6:
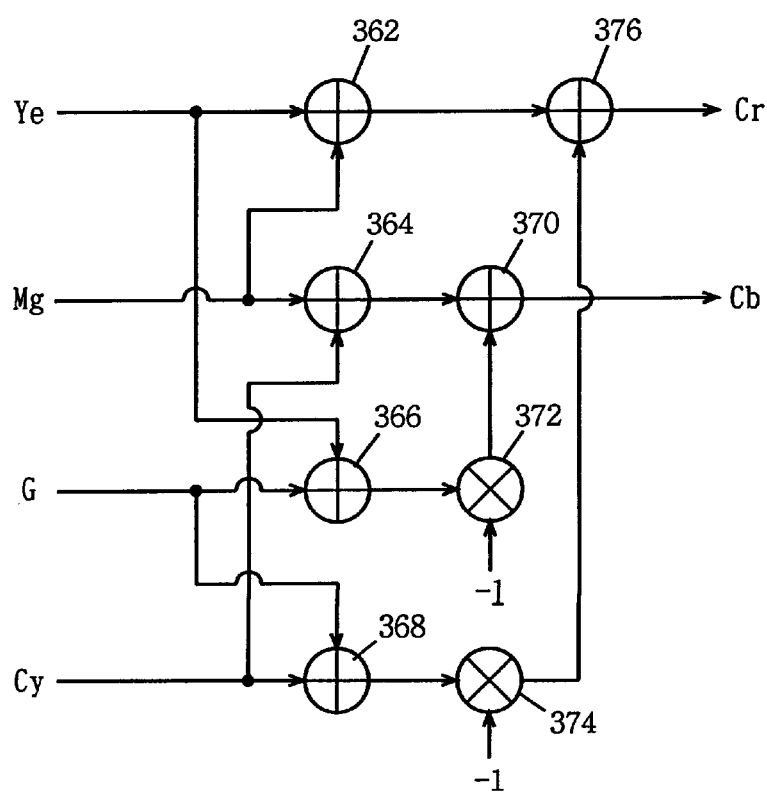
FIG. 6 is a block diagram showing the configuration of color separation circuit 36 in color signal processing system 1000 shown in FIG. 1.

FIG. 6 is a block diagram showing in further detail the configuration of color difference signal generation circuit 36 shown in FIG. 1.

Referring to FIG. 6, color difference signal generation circuit 36 includes an adder 362 which adds received yellow signal Ye and magenta signal Mg, an adder 368 which adds the amplitudes of received green signal G and cyan signal Cy, a multiplier 374 which multiplies the output of adder 368 by −1, and an adder 376 which adds the output of adder 362 and the output of multiplier 374 to output a signal Cr.

Color difference signal generation circuit 36 further includes an adder 364 which adds received magenta signal Mg and cyan signal Cy, an adder 366 which adds the amplitudes of received green signal G and yellow signal Ye, a multiplier 372 which multiplies the output of adder 366 by −1, and an adder 370 which adds the output of adder 364 and the output of multiplier 372 to output a signal Cb.

More specifically, color difference signal separation circuit 36 generates color difference signals Cb and Cr from green signal G, cyan signal Cy, magenta signal Mg and yellow signal Ye by the following operation processings:

$$Cb = (Cy + Mg) - (Ye + G) \quad (14)$$
$$= (R + G + 2B) - (R + 2G)$$
$$= 2B - G$$

$$Cr = (Ye + Mg) - (G + Cy) \quad (15)$$
$$= (2R + G + B) - (B + 2G)$$
$$= 2R - G$$

Generating Luminance Signal and Aperture Signal

Herein, the luminance signal may be generated by the following operation with green signal G, cyan signal Cy, magenta signal Mg and yellow signal Ye obtained by the above-described interpolation processing.

$$Y = (Cy + Mg) + (Ye + G) \quad (16)$$
$$= (R + G + 2B) + (R + 2G)$$
$$= 2R + 3G + 2$$

Figure 13:
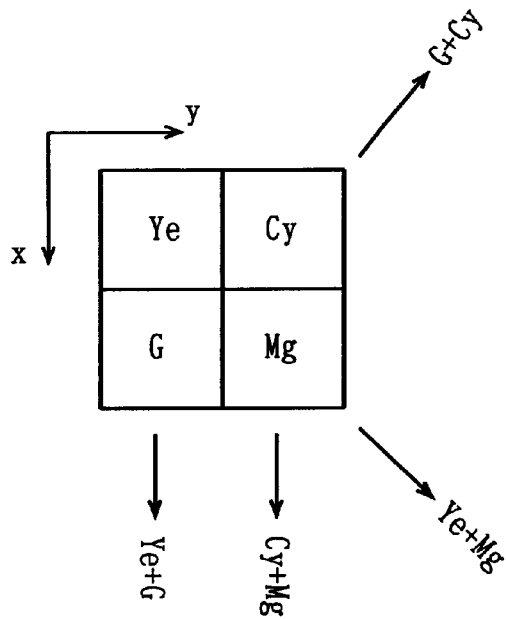
FIG. 13 is a diagram showing the concept of a conventional color separation method.

The luminance signal may be generated by an operation based on the above expression directly from signals corresponding to pixels in a 2 row×2 column matrix surrounding the central position among signals from photoelectric conversion elements corresponding to the pixels in a 4 row×4 column matrix. More specifically, in this case, luminance signal Y is generated according to the same method as the conventional color separation method described in conjunction with FIG. 13.

Unwanted false color signals may be restricted by the interpolation processing, but the resolution may deteriorate because of the interpolation. Human eyes are more sensitive to luminance information than color information, and therefore luminance signal Y obtained without the interpolation processing may be directly used in order to restrict a deterioration in the resolution sensed by human eyes.

This is also true to generation of an aperture signal for aperture correction. More specifically, a luminance signal used as a base for generating an aperture signal desirably has a resolution as high as possible, and use of a signal after an interpolation processing also causes a deterioration in the resolution.

Figures 7, 8:
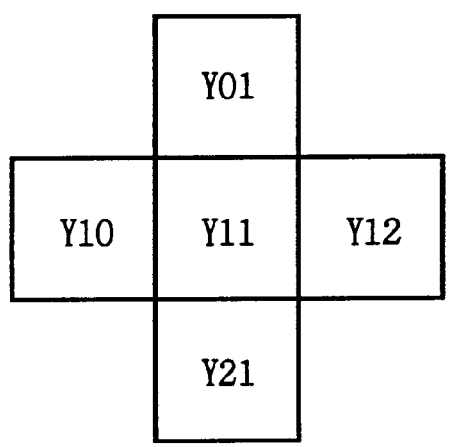
FIG. 7 is a first schematic diagram for use in illustration of the procedure of generating an aperture signal.
FIG. 8 is a second schematic diagram for use in illustration of the procedure of generating an aperture signal.

FIG. 7 is a first schematic diagram for use in illustration of the procedure of generating luminance signal Y as described above and an aperture signal AP. FIG. 8 is a second schematic diagram showing the procedure of generating aperture signal AP.

Referring to FIG. 7, signals Y01, Y10, Y11, Y12 and Y21 are generated by the following operations:

$$Y01 = Ye02 + Cy01 + Mg11 + G12 \quad (17)$$

$$Y10 = Ye20 + Cy21 + Mg11 + G10 \quad (18)$$

$$Y11 = Ye22 + Cy21 + Mg11 + G12 \quad (19)$$

$$Y12 = Ye22 + Cy23 + Mg13 + G12 \quad (20)$$

$$Y21 = Ye22 + Cy21 + Mg31 + G32 \quad (21)$$

More specifically, Y11 corresponds to luminance signal Y. Signals Y01, Y10, Y12 and Y21 are generated from signals from photoelectric conversion elements corresponding to pixels in a 2 row by 2 column matrix including two of the pixels in the 2 row×2 column matrix in the center used to generate Y11.

Now, referring to FIG. 8, aperture signal AP is generated by the following operation based on thus generated signals Y01, Y10, Y11, Y12 and Y21.

$$AP = 4 \times Y11 - Y01 - Y10 - Y12 - Y21 \quad (22)$$

Figure 9:
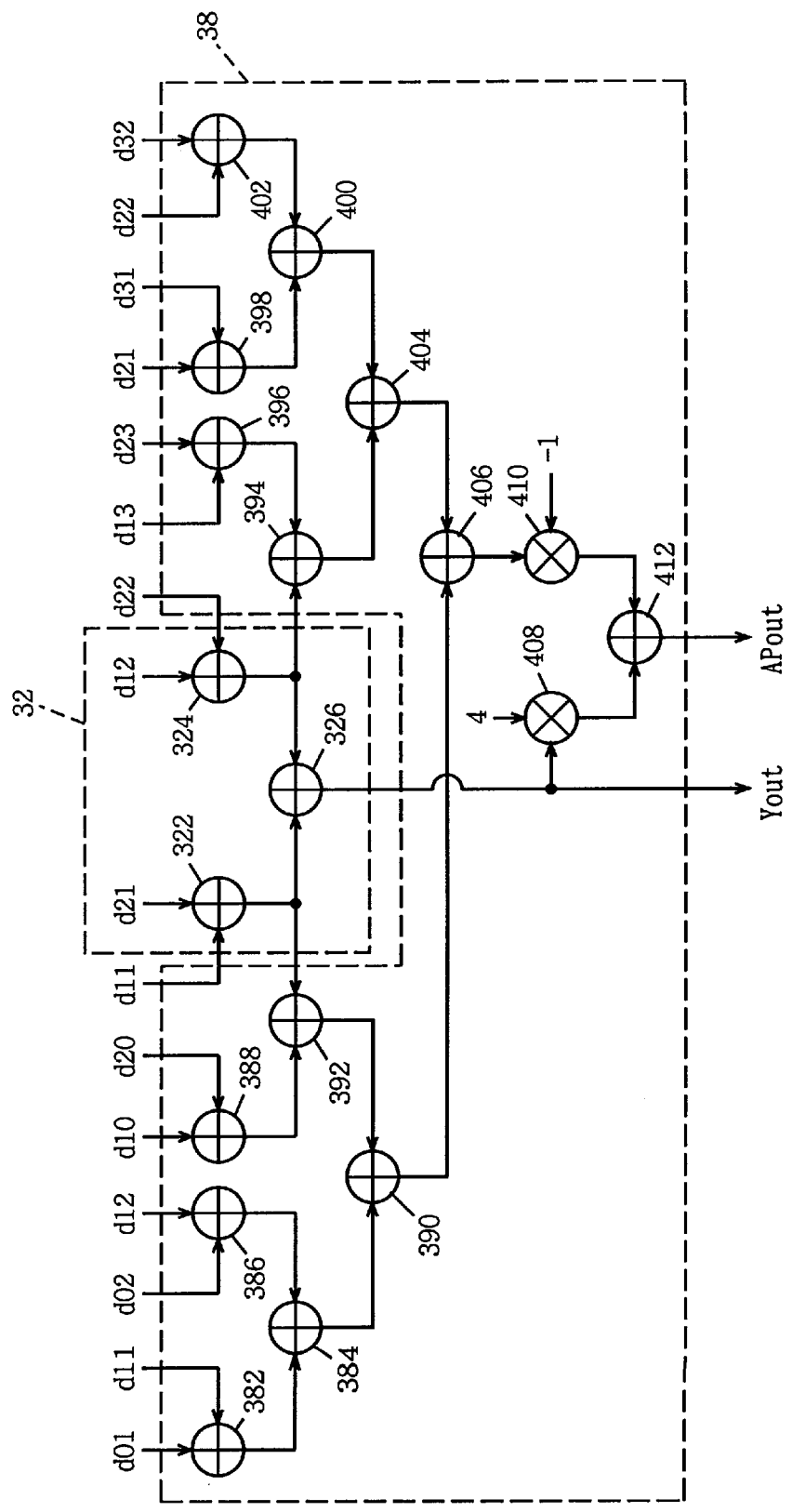
FIG. 9 is a block diagram showing the configuration of luminance signal generation circuit 32 and aperture signal generation circuit 38 in color signal processing system 1000 shown in FIG. 1.
Figure 10:
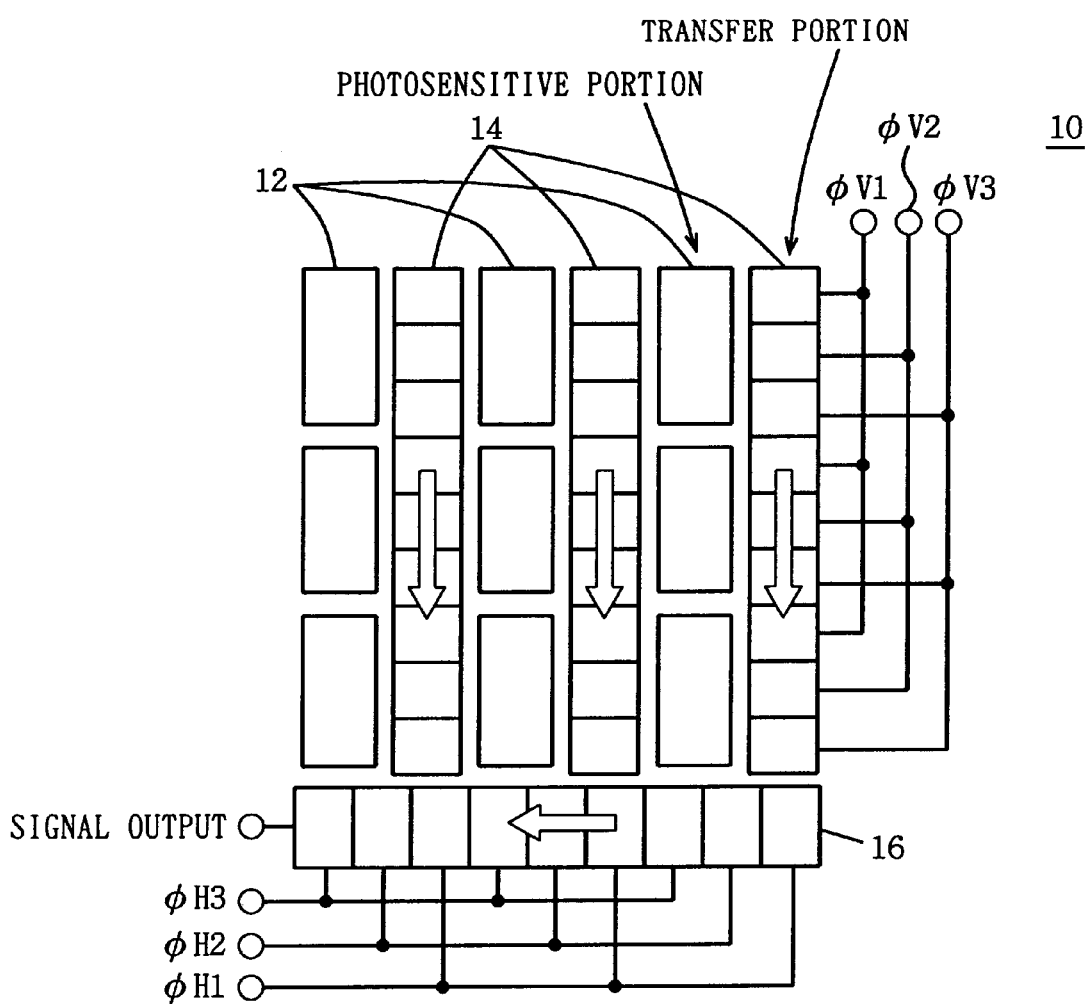
FIG. 10 is a schematic block diagram showing the conventional configuration of a CCD portion 10.

FIG. 9 is a schematic diagram showing in more detail the configuration of luminance signal generation circuit 32 and aperture signal generation circuit 38 shown in FIG. 1.

Luminance signal generation circuit 32 includes an adder 322 which adds the amplitudes of received signals d11 and d21, an adder 324 which adds the amplitudes of received signals d12 and d22, and an adder 326 which adds the amplitudes of outputs received from adders 322 and 324 to output luminance signal Y (Y11).

Aperture signal generation circuit 38 includes an adder 382 which adds received signals d01 and d11, an adder 386 which adds received signals d02 and d12, an adder 384 which adds outputs received from adders 382 and 386, an adder 388 which adds received signals d10 and d20, an adder 392 which adds outputs received from adder 388 and adder 322 in luminance signal generation circuit 32, and an adder 390 which adds the outputs of adders 384 and 392.

Aperture signal generation circuit 38 further includes an adder 398 which adds received signals d21 and d31, an adder 402 which adds received signals d22 and d32, an adder 400 which adds outputs received from adders 398 and 402, an adder 396 which adds received signals d13 and d23, an adder 394 which adds outputs received from adder 396 and adder 324 in luminance signal generation circuit 32, an adder 404 which adds the outputs of adders 394 and 400, an adder 406 which adds the outputs of adders 390 and 404, a multiplier 410 which multiplies the output of adder 406 by −1, a multiplier 408 which multiplies luminance signal Y by 4, and an adder 412 which adds outputs received from multipliers 408 and 410 to output signal AP.

More specifically, luminance signal generation circuit 32 outputs luminance signal Y based on an operation represented by expression (19), while aperture signal generation circuit 38 generates aperture signal AP by operations based on expressions (17) to (21) for output.

In the foregoing structure, when aperture signal AP is generated, luminance signal Y based on signals from photoelectric conversion elements corresponding to pixels in a 2 row by 2 column matrix surrounding the central position in a 4 row by 4 column matrix is used, and therefore a deterioration in the resolution caused by interpolation processing may be restricted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A 1-chip digital color camera comprising:
    solid-state imaging means having:
        an array of photoelectric conversion elements, each of the elements corresponding to a pixel in a plurality of pixels; and
        a color filter array in which a green filter and first to third complementary color filters are arranged, corresponding to said photoelectric conversion elements, in a mosaic arrangement in a k-row by k-column matrix (where k is an even number) with ones of the color filters being associated with outputs of corresponding ones of the photoelectric conversion elements; and
    color separation means, responsive to said solid-state imaging means, for generating color data corresponding to a central position in the k-row by k-column matrix, wherein said color separation means comprises:
        color interpolation means for producing weighted averages of outputs from ones of the photoelectric conversion elements so as to generate each of green and first to third complementary color signals, wherein the color interpolation means forms said weighted averages using four sets of matrix-arranged weighting coefficients, each of the sets associated with a corresponding one of said green and said first to third complementary color signals, such that a matrix arrangement of the weighting coefficients in one of the sets corresponds to the matrix arrangement of the weighting coefficients in any other one of the sets rotated through a corresponding number of 90 degree increments about the central position in the matrix; and
        first operation means, responsive to said color interpolation means, for separating, from said weighted averages, the color data corresponding to the central position.

2. The 1-chip digital color camera as recited in claim 1, wherein
    said color filter array includes a plurality of first rows and a plurality of second rows alternately arranged,
    each said first row includes green filters and first complementary color filters alternately arranged, and
    each said second row has second complementary color filters and third complementary color filters alternately arranged.

3. The 1-chip digital color camera as recited in claim 1, wherein said color separation means further comprises:
    conversion means for converting received signals serially output for each row in the array of said photoelectric conversion elements into parallel signals for each of said k rows; and
    first holding means, responsive to the output of said conversion means, for holding signals for a k row by k-column matrix;
    wherein said color interpolation means performs weighted average processing based on the signals held by said holding means.

4. The 1-chip digital color camera as recited in claim 3, further comprising second holding means, responsive to the output of said solid-state imaging means, for holding output signals from even rows and odd rows in the array of said photoelectric conversion elements for 1 image frame so as to define held signals, and applying said held signals to said conversion means.

5. The 1-chip digital color camera as recited in claim 1, wherein
    said even number k is 4.

6. The 1-chip digital color camera as recited in claim 5, wherein
    said color separation means includes second operation means for adding outputs from said photoelectric conversion elements in the 2 row by 2 column matrix surrounding said central position among outputs from said photoelectric conversion elements corresponding to the pixels in said 4 row by 4 column matrix to output a luminance signal.

7. The 1-chip digital color camera as recited in claim 6, further comprising aperture signal generation means for generating and outputting an aperture signal based on a first signal which is the sum of D (0, 1), D (0, 2), D (1, 1) and D (1, 2), a second signal which is the sum of D (1, 0), D (1, 1), D (2, 0) and D (2, 1), a third signal which is the sum of D (2, 1), D (2, 2), D (3, 1) and D (3, 2), a fourth signal which is the sum of D (1, 2), D (1, 3), D (2, 2) and D (2, 3), and said luminance signal among the outputs from said photoelectric conversion elements corresponding to the pixels in said 4 row by 4 column matrix, when the outputs from the photoelectric conversion elements corresponding to the pixels in said 4 row by 4 column matrix are D (x, y) (x=0 to 3, y=0 to 3), and
    correction means responsive to said aperture signal for performing aperture correction.

8. The 1-chip digital color camera as recited in claim 5, wherein
    said color separation means further includes,
    conversion means for converting received signals serially output for each row in the array of said photoelectric conversion elements into parallel signals for each said k rows, and
    first holding means for holding the output of said conversion means for holding signals in a 4 row by 4 column matrix so as to define held signals, and
    said color interpolation means performs a weighted average processing based on the signals held by said holding means.

9. The 1-chip digital color camera as recited in claim 8, further comprising second holding means, responsive to the output of said solid-state imaging means, for holding output signals from even rows and odd rows in the array of said photoelectric conversion elements for 1 image frame and applying said held signals to said conversion means.

10. The 1-chip digital color camera as recited in claim 5, wherein
    when said first to third complementary colors are magenta, yellow and cyan, respectively the outputs from the photoelectric conversion elements corresponding to the pixels in said 4 row by 4 column matrix are D (x, y) (x=0 to 3, y=0 to 3), and a weighting coefficient corresponding to said D (x, y) is w (x, y), said interpolation average selectively performs one of a first weighted average processing, wherein w (1, 2)=2, w=(1, 0)=1 and w (3, 2)=1, a second weighted average processing wherein w (1, 1)=2, w=(3, 1)=1 and w (1, 3)=1, a third weighted average processing, wherein w (2, 1)=2, w=(2, 3)=1 and w (0, 1)=1, and a fourth weighted average processing, wherein w (2, 2)=2, w=(0, 2)=1, w (2, 0)=1, depending upon the arrangement of color filters corresponding to the pixels in said 4 row×4 column matrix.

11. The 1-chip digital color camera as recited in claim 10, wherein said color separation means includes second operation means for adding outputs from said photoelectric conversion elements in the 2 row by 2 column matrix surrounding said central position among outputs from said photoelectric conversion elements corresponding to the pixels in said 4 row by 4 column matrix to output a luminance signal.

* * * * *